(12) United States Patent
Kuno

(10) Patent No.: US 8,177,282 B2
(45) Date of Patent: May 15, 2012

(54) VEHICLE SEAT

(75) Inventor: Satoru Kuno, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 131 days.

(21) Appl. No.: 12/480,005

(22) Filed: Jun. 8, 2009

(65) Prior Publication Data
US 2009/0302633 A1 Dec. 10, 2009

(30) Foreign Application Priority Data
Jun. 9, 2008 (JP) ................................. 2008-150219

(51) Int. Cl.
B60N 2/14 (2006.01)
(52) U.S. Cl. .................................. 296/65.16; 296/65.05
(58) Field of Classification Search .................... 296/63, 296/65.16, 65.18, 65.03, 65.05; 297/1, 3, 297/14, 15, 324, 326, 336, 344.15
See application file for complete search history.

(56) References Cited

U.S. PATENT DOCUMENTS

| 2,797,732 | A | * | 7/1957 | Thomas .......................... 248/398 |
| 5,593,208 | A | * | 1/1997 | Mitschelen et al. ........... 297/336 |
| 5,941,591 | A | | 8/1999 | Tsuge et al. |
| 6,135,555 | A | * | 10/2000 | Liu et al. ........................ 297/336 |
| 6,196,613 | B1 | | 3/2001 | Arai |
| 6,523,899 | B1 | * | 2/2003 | Tame ............................. 297/331 |
| 6,595,588 | B2 | * | 7/2003 | Ellerich et al. ................ 297/331 |
| 6,698,813 | B2 | | 3/2004 | Nonaka et al. |
| 6,793,285 | B1 | * | 9/2004 | Tame ............................. 297/336 |
| 7,219,946 | B2 | * | 5/2007 | Tame et al. ................. 296/65.11 |
| 7,237,837 | B2 | * | 7/2007 | Queveau et al. ................ 297/15 |
| 7,762,604 | B1 | * | 7/2010 | Lindsay .......................... 296/64 |
| 2009/0108615 | A1 | | 4/2009 | Akiyu et al. |
| 2009/0179477 | A1 | | 7/2009 | Yamazaki et al. |
| 2009/0302632 | A1 | * | 12/2009 | Kuno et al. ................. 296/65.09 |
| 2010/0156134 | A1 | * | 6/2010 | McBride .................... 296/65.09 |
| 2010/0237673 | A1 | * | 9/2010 | Lindsay .................... 297/378.13 |

FOREIGN PATENT DOCUMENTS

| DE | 102006012137 | 9/2007 |
| EP | 0622268 | 11/1994 |
| JP | 3083264 U | 10/2001 |

(Continued)

OTHER PUBLICATIONS

English language Abstract of JP 2007-153216, Jun. 21, 2007.

(Continued)

*Primary Examiner* — Jason S Morrow
(74) *Attorney, Agent, or Firm* — Greenblum & Bernstein, P.L.C.

(57) ABSTRACT

A vehicle seat is provided. The vehicle seat includes: a seat cushion including a seating part, a front leg which is rotatably attached to the seating part at a front side, and rear legs which support a rear side of the seating part; and a seatback is provided rotatably to the rear side of the seat cushion. The front leg is rotatably attached to a vehicle floor, the rear legs are detachably attached to the vehicle floor, and the vehicle seat is adapted to be arranged into a seating mode and a storage mode. In the seating mode, the seatback is locked on the seat cushion in an upright state, and the rear legs are locked on the vehicle floor, and in the storage mode, the seat cushion is turned forward by unlocking the lock on the seatback and the locks on both of the rear legs.

13 Claims, 3 Drawing Sheets

FOREIGN PATENT DOCUMENTS

| | | |
|---|---|---|
| JP | 2003-165366 | 6/2003 |
| JP | 2003-165367 | 6/2003 |
| JP | 2003-226176 | 8/2003 |
| JP | 2003-237436 | 8/2003 |
| JP | 2003-276548 | 10/2003 |
| JP | 2003-276556 | 10/2003 |
| JP | 2005-343276 | 12/2005 |
| JP | 2007-153216 | 6/2007 |
| JP | 2007-153217 | 6/2007 |
| JP | 2007-153218 | 6/2007 |

OTHER PUBLICATIONS

English language Abstract of JP 2007-153217, Jun. 21, 2007.
English language Abstract of JP 2007-153218, Jun. 21, 2007.
Nissan Nuvu Concept from Paris Motor Show (Oct. 2-19, 2008).
Suzuki px Concept from Tokyo Motor Show (Oct. 21-Nov. 6, 2005).
Mazda Neospace Concept from Frankfurt Motor Show (Sep. 14-26, 1999).
Nissan yanya Concept from Geneve Motor Show (Mar. 5-18, 2002).
Renault Be Bop Concept from Frankfurt Motor Show (Sep. 9-21, 2003).
Nissan Kino Concept from Tokyo motor Show (Oct. 27-Nov. 7, 2001).
Mitsubishi EZ MIEW 02 Concept from Geneva Motor Show (Mar. 2-12, 2006).
ISUZU Zen Concept from Tokyo Motor Show (Oct. 27-Nov. 7, 2001).
Nissan Bevel Concept from Detroit motor Show (Jan. 7-21, 2007).
English language Abstract of JP 2005-343276, Dec. 15, 2005.
English language Abstract of JP 2003-165367, Jun. 10, 2003.
English language Abstract of JP 2003-226176, Aug. 12, 2003.
English language Abstract of JP 2003-237436, Aug. 27, 2003.
English language Abstract of JP 2003-276548, Oct. 2, 2003.
English language Abstract of JP 2003-276556, Oct. 2, 2003.
English language Abstract of JP 2003-165366, Jun. 10, 2003.
U.S. Appl. No. 12/479,992 to Kuno et al., filed Jun. 8, 2009.

* cited by examiner

VEHICLE SEAT

BACKGROUND OF THE INVENTION

1. Field of the Invention

The present invention relates to a vehicle seat, and more particularly, to a vehicle seat which can be arranged from a seating mode into a storage mode.

2. Description of the Related Art

Japanese Patent Application Publication No. 2003-165366 describes a front passenger seat including a seat cushion and a seatback. The seatback is allowed to tilt forward, and the seat cushion is allowed to slide forward with the seatback kept tilting forward, so as to hold the front passenger seat in a stored state. With this configuration, a space can be largely secured between the front passenger seat and a rear seat provided rearward of the front passenger seat. In other words, a space can be largely secured in front of the rear seat. Accordingly, for example, an occupant of the rear seat behind the front passenger seat can sit thereon with his or her legs stretched out.

However, if the above-described front passenger seat is applied to a small vehicle, a large space could not be secured in front of the rear seat behind the front passenger seat even if the front passenger seat is held in the stored state. Accordingly, there has been a demand for a front passenger seat with a novel storage structure.

SUMMARY OF THE INVENTION

It is an aspect of the present invention to provide a vehicle seat which can be stored in such a state that a large space is secured in front of a rear seat even in a case where the vehicle seat is applied to a small vehicle.

According to an exemplary embodiment of the present invention, there is provided a vehicle seat comprising: a seat cushion comprising: a seating part which configures an occupant seating portion; a front leg which is rotatably attached to the seating part at a front side of the seating part to support the seating part; and a pair of left and right rear legs which support a rear side of the seating part; and a seatback which is provided rotatably to the rear side of the seat cushion. The front leg is rotatably attached to a vehicle floor at a distal end of the front leg, the pair of left and right rear legs are detachably attached to the vehicle floor at distal ends of the rear legs, and the vehicle seat is adapted to be arranged into a seating mode and a storage mode. In the seating mode, the seatback is locked on the seat cushion in an upright state, and the pair of left and right rear legs are locked on the vehicle floor at the distal ends, and in the storage mode, the seat cushion is turned forward by unlocking the lock on the seatback and the locks on both of the rear legs.

According to the configuration described above, when the vehicle seat is arranged into the seating mode, the occupant can be seated in the seat cushion, and the back of the occupant can be supported by the seatback in the seated state. In addition, when the vehicle seat is arranged into the storage mode, even in the case of the vehicle seat being applied to a small vehicle, a large space can be secured in front of a rear seat which is disposed behind the vehicle seat.

DETAILED DESCRIPTION

Figure 1:
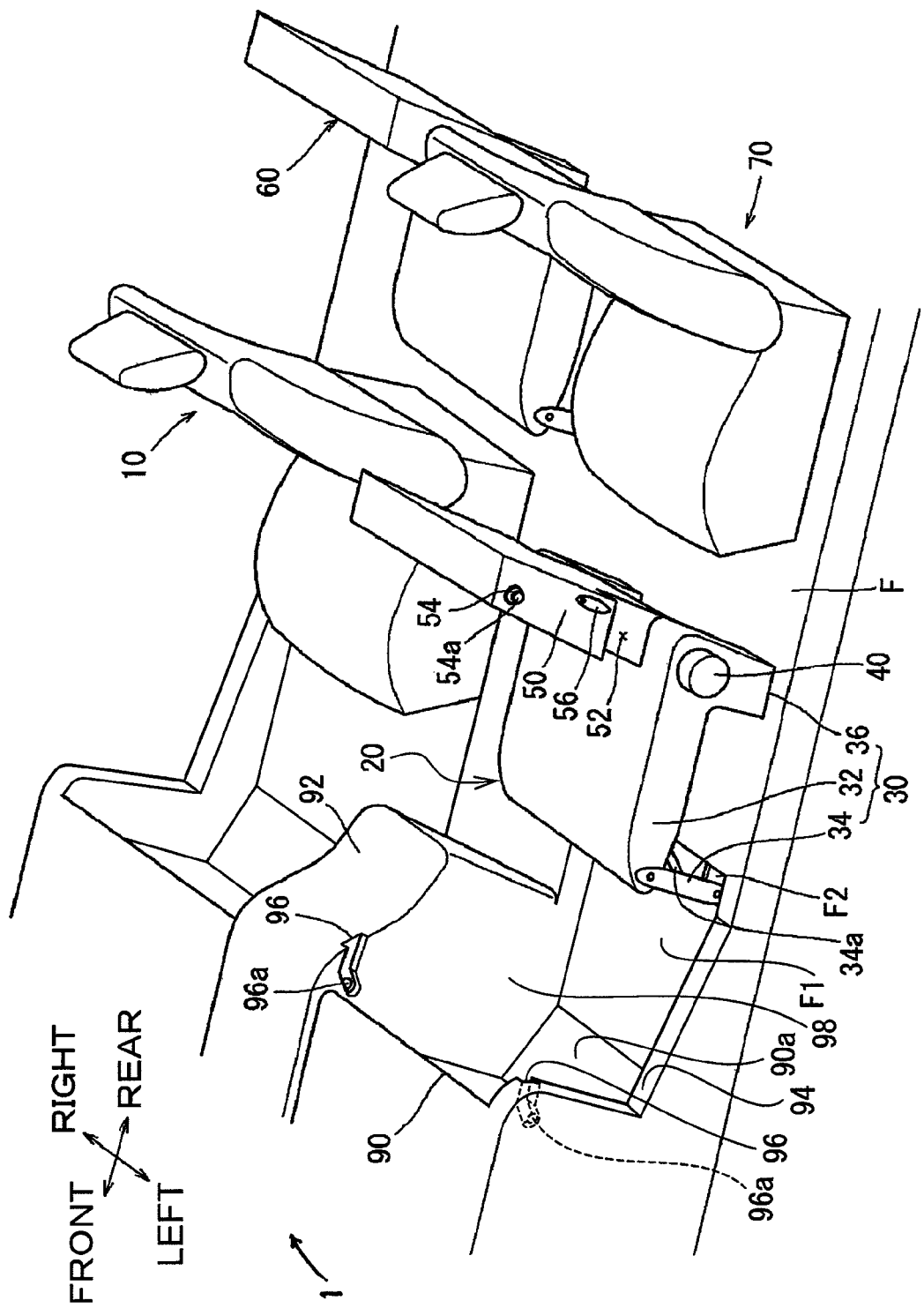
FIG. 1 is a schematic perspective view of an interior of a vehicle including a vehicle seat according to an embodiment of the present invention when the vehicle seat is arranged into a seating mode.
Figure 2:
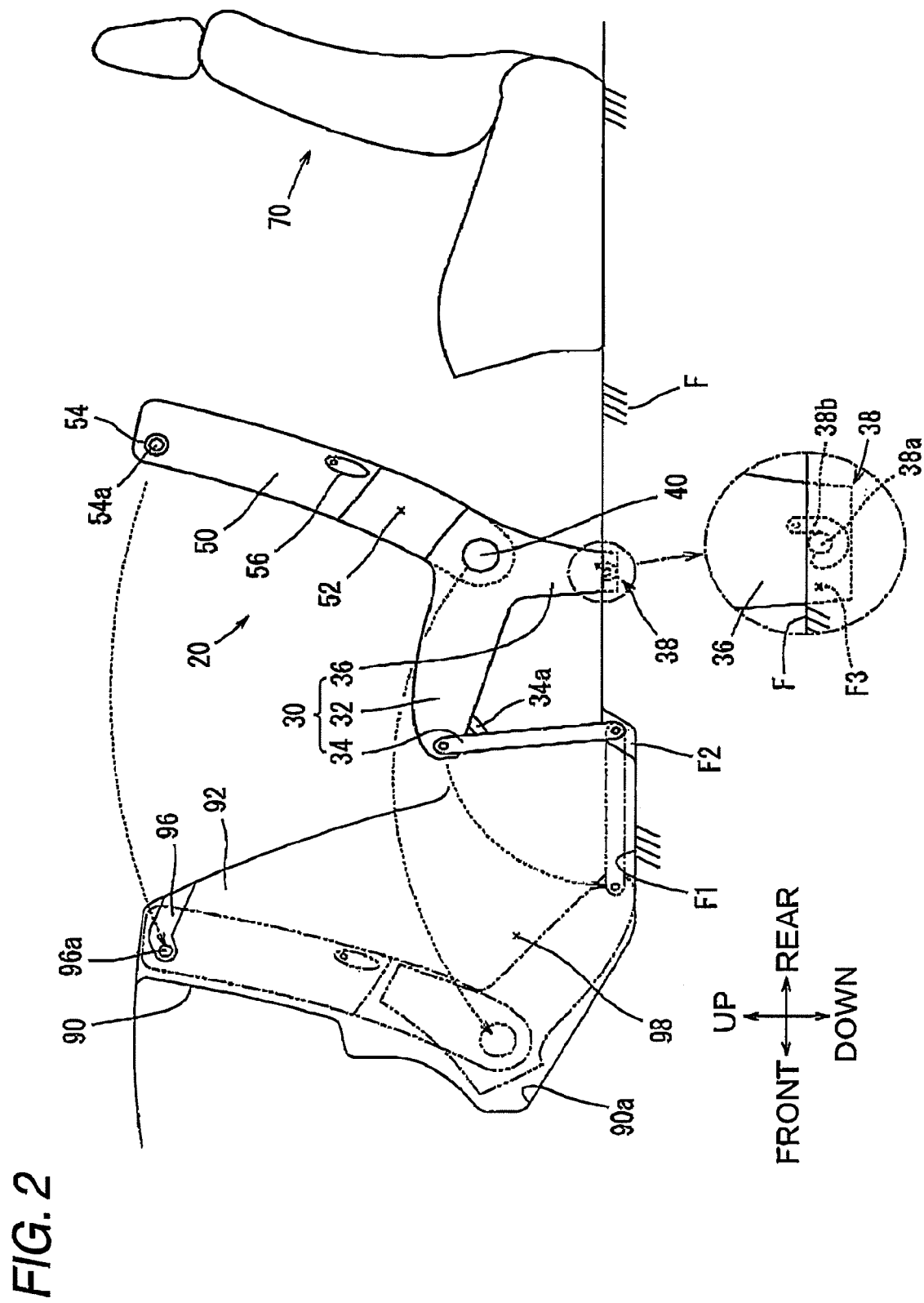
FIG. 2 is a side view of FIG. 1.
Figure 3:
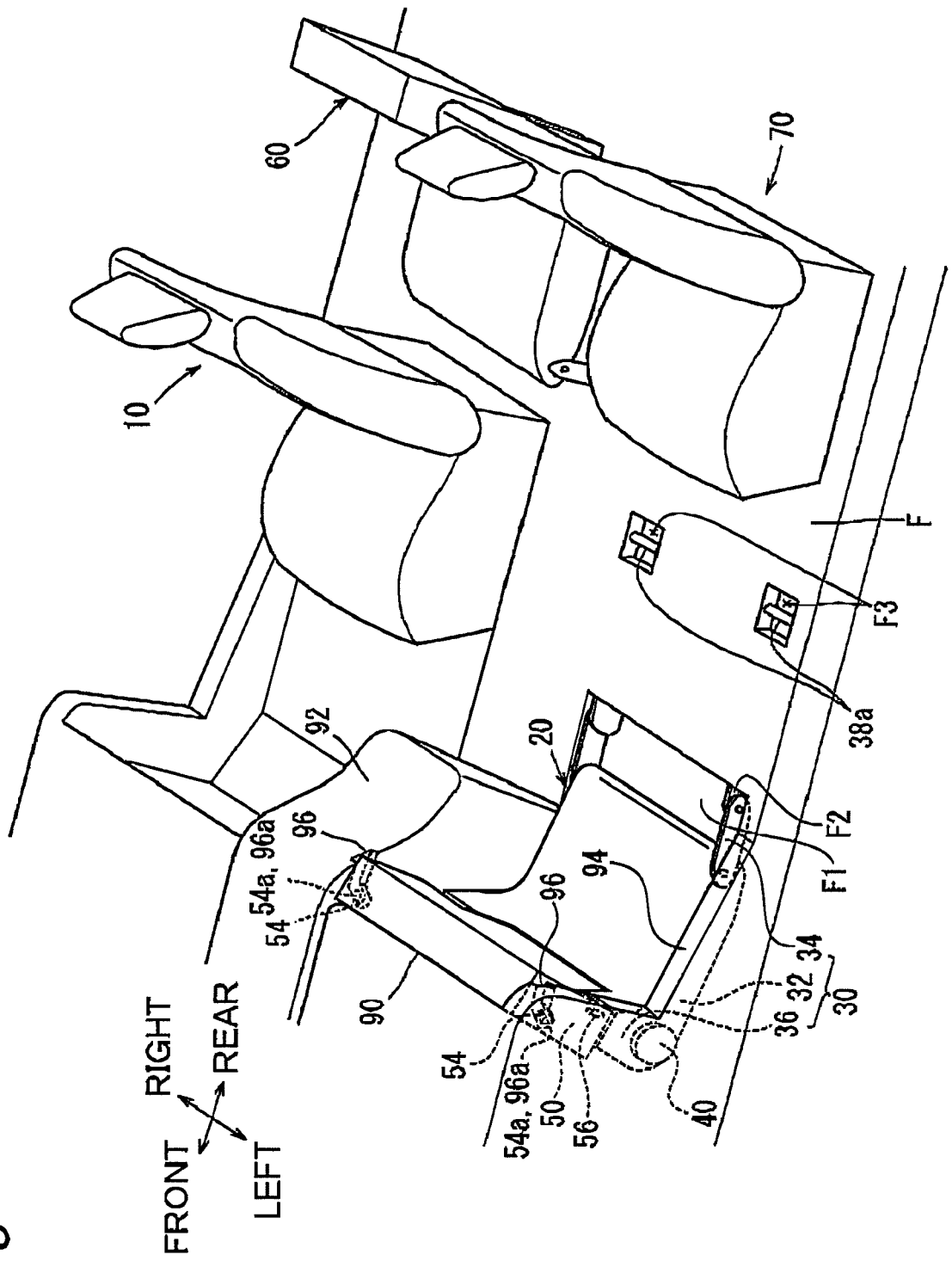
FIG. 3 is a schematic perspective view of the interior of the vehicle when the vehicle seat in FIG. 1 is arranged into a storage mode.

Hereinafter, exemplary embodiments of the present invention will be described with reference to FIGS. 1 to 3. FIG. 1 is a schematic perspective view of an interior of a vehicle including a vehicle seat according to an embodiment of the present invention when the vehicle seat is arranged into a seating mode. FIG. 2 is a side view of FIG. 1. FIG. 3 is a schematic perspective view of the interior of the vehicle when the vehicle seat shown in FIG. 1 is arranged into a storage mode. It is noted that in the following description, up, down, front, rear, left and right denote upward, downward, forward, rearward, leftward and rightward directions described in the drawings, respectively, that is, upward, downward, forward, rearward, leftward and rightward directions based on a vehicle 1.

Referring to FIGS. 1, 2, the configuration of the vehicle 1 to which a vehicle seat according to an embodiment of the present invention is applied will be described. This vehicle, which may be a small vehicle, has four seats in total which include a driver seat 10, a front passenger seat 20, and a driver seat side rear seat 60 and a front passenger seat side rear seat 70 which are disposed behind the respective front seats. In these four seats, the front passenger seat 20 corresponds to the vehicle seat of the present invention. Additionally, in these four seats, the driver seat 10, the driver seat side rear seat 60 and the front passenger seat side rear seat 70 are known seats, and therefore, a detailed description thereof will be omitted here. Accordingly, only the configuration of the front passenger seat 20 will be described herein.

The front passenger seat 20 is made up of a seat cushion 30 and a seatback 50. Hereinafter, these respective constituent component members 30, 50 will be described individually. Firstly, the seat cushion 30 will be described. The seat cushion 30 is made up of a seating part 32 which constitutes an occupant's seating portion, a pair of left and right front legs 34, 34 which support a front side of the seating part 32, and a pair of left and right rear legs 36, 36 which support a rear side of the seating part 32. It is noted that the pair of left and right front legs 34, 34 may be one front leg as long as the front leg supports the front side of the seating part 32.

Both the front legs 34 are rotatably attached to the seating part 32 at proximal ends thereof to be rotatable about pivots whose axial directions are oriented in a width direction (a left-right direction) of the seating part 32. Both of the front legs 34 are provided with stoppers 34a which interfere with the seating part 32, respectively. With this configuration, when the seat cushion 30 is put into a locked state relative to a vehicle floor F by locking mechanisms 38, which will be described later, both the front legs 34 are regulated so as not to fall forward together with the seatback 50. Accordingly, when the seat cushion 30 is put in the locked state, the occupant can sit on the seating part 32. On the other hand, both of the rear legs 36 are configured such that proximal ends thereof are integral with the seating part 32.

Next, the seatback 50 will be described. The seatback 50 configures a back supporting portion which supports the back of the occupant sitting on the seat cushion 30 (the seating part 32) and is assembled provided) to a rear side of the seat cushion 30 via a simple reclining mechanism 40. With this configuration, the seatback 50 is rotatable relative to the seat cushion 30. A lock device (not shown) is provided on this simple reclining mechanism 40. With this configuration, the seatback 50 can be locked (held) in an upright state relative to the seat cushion 30, and when the lock is unlocked, the seatback 50 becomes rotatable to fall rearward (recline) relative to the seat cushion 30.

The seatback 50 is formed with cutouts 52, 52 at lower positions of the left and right sides of the seatback 50. With this configuration, when the seatback 50 is rotated to fall rearward relative to the seat cushion 30, the rear legs 36 of the seat cushion 30 comes to fit into the cutouts 52, respectively. Further, the seatback 50 is formed with projections 54, 54 at upper positions of the left and right sides of the seatback 50. The projections 54, 54 are provided with pins 54a, 54a so as to advance and retreat relative to surfaces of the projections 54, 54. Both the pins 54a, 54a are urged in a direction in which the pins 54a advance.

In addition, a lever 56 is provided to the left side of the seatback 50 to be operable by the occupant. Specifically, the lever 56 is configured to be operated in two stages. Among the two stage operations, when a first stage operation is performed, the pins 54a of the projections 54 are caused to retreat into interiors of the projections 54, respectively, against the urging forces, and the lock mechanisms 38 is unlocked, which will be described later. When a second stage operation is performed, the lock on the seatback 50 by the simple reclining mechanism 40 is unlocked.

In addition, both back surfaces (a surface opposite to the seating surface and a surface opposite to the back supporting surface) of the seat cushion 30 and the seatback 50 are individually made so as to form a designed surface. In addition, the seat cushion 30 and the seatback 50 are each integrally molded of a synthetic resin which has rigidity as a material quality thereof. In addition, when compared with a seat cushion and a seatback of the driver seat 10, the seat cushion 30 and the seatback 50 are formed compact. Namely, the driver seat 10 is made up of a larger size seat, while the front passenger seat 20 is made up of a smaller size seat. The front passenger seat 20 is configured in the way described above.

Next, a mounting configuration of the front passenger seat 20 to the vehicle floor F will be described. Both the front legs 34 of the seat cushion 30 are rotatably attached, respectively, to mounting brackets F2 which are formed at stepped portions F1 of the vehicle floor F at distal ends thereof to be rotatable about pivots whose axial directions are oriented in a vehicle width direction. In addition, both the rear legs 36 of the seat cushion 30 are detachably attached (mounted) on the vehicle floor F at distal ends thereof via the locking mechanisms 38.

Here, the lock mechanism 38 will be described in detail. The lock mechanism 38 is made up of a striker 38a which is formed on the vehicle floor F (for example, a recess portion F3 which is formed in the vehicle floor F), and a hook 38b which is formed on the rear leg 36. When the lock mechanism 38 is put in a locked state in which the hook 38b is brought into engagement with the striker 38a, the seat cushion 30 (the seating part 32) is locked on the vehicle floor F so that the occupant can sit thereon. In this state, the front passenger seat 20 is disposed so as to be substantially parallel to the driver seat 10. In addition, when the locks on the strikers 38a by the corresponding hooks 38b are unlocked, the seat cushion 30 is allowed to turn forward about the pivot shafts disposed at the proximal end sides of the front legs 34, while both the front legs 34 of the seat cushion 30 fall forwards. In this way, the front passenger seat 20 is mounted on the vehicle floor F.

Additionally, the front passenger seat 20 is mounted on to the vehicle floor F so as to face an instrument panel 90 of the vehicle in front of the front passenger seat 20. Guide grooves 96, 96 are formed on a left side wall surface of a center console 92 and a front passenger seat side panel surface 94, respectively. The grooves 96, 96 guide the projections 54 of the seatback 50, respectively. Pin catches 96a are formed at terminating ends of both the guide grooves 96 so that the pins 54a of both the projections 54 of the seatback 50 can be fitted thereinto.

Hereinafter, the operation of the front passenger seat 20 which is configured as described above will be described. This front passenger seat 20 can be arranged into a seating mode and a storage mode. Hereinafter, the respective modes and methods of arranging the front passenger seat into the respective modes will be described individually.

Firstly, the seating mode will be described. In the seating mode, the seatback 50 is locked in an upright state relative to the seat cushion 30 by the simple reclining mechanism 40, and both the distal ends of the pair of left and right rear legs 36, 36 are locked on the vehicle floor F by the lock mechanisms 38. When the front passenger seat 20 is arranged into this seating mode, the occupant can sit on the seat cushion 30 and the back of the occupant can be supported on the seatback 50 in the seated state (refer to FIGS. 1, 2).

On the other hand, in the storage mode, the seat cushion 30 has been turned forwards so that the back supporting surface of the seatback 50 and a seating surface of the seating part 32 of the seat cushion 30 fit, respectively, to the instrument panel 90 and a toe board provided below the instrument panel 90 in front of the front passenger seat 20. When the front passenger seat 20 is arranged into the storage mode, the front passenger seat 20 can be stored in such a state that a large space is secured in front of the front passenger seat side rear seat 70 (refer to FIG. 3).

Next, there will be described a method for arranging the front passenger seat 20 from the seating mode into the storage mode. Firstly, the occupant operates the lever 56 on the front passenger seat 20 to the second stage, so as to unlock the locks on the rear legs 36 by the lock mechanisms 38 and the lock on the seatback 50 by the simple reclining mechanism 40. Next, the occupant turns the seat cushion 30 forward about the pivots at the proximal end sides of the front legs 34 while falling the both the front legs 34 of the seat cushion 30 forward and recline the seatback 50 relative to the seat cushion 30.

When the seatback 50 is reclined in that way, the pair of left and right rear legs 36 of the seat cushion 30 are allowed to fit in the left and right cutouts 52, 52 formed on the seatback 50, respectively. Accordingly, the seat cushion 30 is turned forward with the rear legs thereof kept fitting in the cutouts of the seatback 50, respectively. When the seatback 50 reaches a foot wall 98 as the seat cushion 30 is turned forward in that way, both the projections 54 of the seatback 50 are guided by both the guide grooves 96 on the center console 92 and the panel surface 94.

When the guiding of the projections 54 by the guide grooves 96 starts, both the pins 54a are made to shift from an advancing state to a retreating state against urging forces exerted thereon. Further, as the seat cushion 30 continues to be turned forward, the back supporting surface of the seatback 50 and the seating surface of the seating part 32 of the seat cushion 30 fit, respectively, to the instrument panel 90 and the toe board provided below the instrument panel 90 in front of the front passenger seat 20. Then, both of the pins 54a of the projections 54 reaches the pin catches 96a of both the guide grooves 96 and return from the retreating state to the advancing state by the urging forces exerted thereon. With this action, the pins 54a of both the projections 54 fit in the pin catches 96a of both the guide grooves 96, respectively. In this way, the front passenger seat 20 can be arranged into the storage mode, in addition, the front passenger seat 20 can be held in the state in which it is arranged into the storage mode.

Hereinafter, a method for rearranging the front passenger seat 20 back into the seating mode from the storage mode will be described in contrast to the above. Firstly, the occupant operates the lever 56 to the first stage, causing the pins 54a of both the projections 54 to retreat into the interiors of the projections 54 against the urging forces exerted thereon. Namely, the holding of the front passenger seat 20 in the storage mode is released. Next, the occupant causes the seatback 50 to shift to the rear so that the seat cushion 30 turns to the rear about the pivots disposed at the proximal end sides of the front legs 34 while both of the front legs 34 to fall to the rear.

When the seat cushion 30 continues to be turned in that way, the seatback 50 returns to the state in which the seatback 50 becomes upright relative to the seat cushion 30. When the seatback 50 is returned to the upright state, the seatback 50 is returned to the locked state relative to the seat cushion 30. In addition, when the seat cushion 30 continues to be turned further, since the pair of left and right rear legs 36 of the seat cushion 30 reach the vehicle floor F, the seat cushion 36 is returned to the state in which the hooks 38b are brought into engagement with the strikers 38a, respectively. By this action, the front passenger seat 20 can be arranged back into the seating mode from the storage mode, and the front passenger seat 20 can be held in such a state that the front passenger seat 20 is kept arranged in the seating mode.

The front passenger seat 20 according to the embodiment of the present invention, when the front passenger seat 20 is arranged into the seating mode, the occupant can sit on the seat cushion 30, and the back of the occupant can be supported by the seatback 50 in the seated state. In addition, when the front passenger seat 20 is arranged into the storage mode, even in the case of the front passenger seat 20 being applied to a small vehicle, a large space can be secured in front of the front passenger seat side rear seat 70.

Additionally, according to the above-described configuration, both the rear sides of the seat cushion 30 and the seatback 50 have designed surfaces. Therefore, the front passenger seat 20 can be stored with an excellent appearance.

Additionally, according to the configuration as described above, the front passenger seat 20 can be stored in such a state that the seatback 50 is locked on the instrument panel 90 side. Therefore, even when the vehicle is running, the front passenger seat 20 can be stored without rattling.

In addition, according to the configuration as described above, the cutouts 52, 52 are formed on the left- and right-hand lateral surfaces of the seatback 50, and when the front passenger seat 20 is arranged into the storage mode from the seating mode, the pair of left and right rear legs 36 of the seat cushion 36 can fit in the cutouts 52, respectively, and the front passenger seat 20 can be arranged with both the rear legs 36 kept fitting in both the cutouts 52, respectively. Therefore, comparing with a case where no cutout 52 is formed on the seatback 50, the back supporting surface of the seatback 50 can be secured largely.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A vehicle seat comprising:
   a seat cushion comprising:
      a seating part configured as an occupant seating portion;
      a front leg which is rotatably attached to the seating part at a front side of the seating part to support the seating part; and
      a pair of left and right rear legs which support a rear side of the seating part; and
   a seatback which is provided rotatably to a rear side of the seat cushion, wherein
      the front leg is rotatably attached to a vehicle floor at a distal end of the front leg, and
      the pair of left and right rear legs are detachably attached to the vehicle floor at distal ends of the rear legs;
   the vehicle seat is configured to be arranged into a seating mode and a storage mode, wherein
      in the seating mode, the seatback is locked on the seat cushion in an upright state, and the pair of left and right rear legs are locked on the vehicle floor at the distal ends,
      in the storage mode, the seat cushion is turned forward by an unlocking of the seatback and both of the rear legs from the vehicle floor, and the front leg is pivoted forwardly and downwardly towards the vehicle floor, and
   an angle defined between a seating surface of the seating part of the seat cushion and a back supporting surface of the seatback in the storage mode is larger than an angle defined between the seating surface of the seating part of the seat cushion and the back supporting surface of the seatback in the seating mode.

2. The vehicle seat according to claim 1, wherein in the storage mode, the back supporting surface of the seatback and the seating surface of the seating part of the seat cushion fit, respectively, to an instrument panel and a toe board provided below the instrument panel in front of the vehicle seat.

3. The vehicle seat according to claim 1, wherein back sides of the seat cushion and the seatback have designed surfaces, respectively.

4. The vehicle seat according to claim 1, wherein when the vehicle seat is arranged into the storage mode, at least one of the seat cushion and the seat back is held in the storage mode.

5. The vehicle seat according to claim 1, wherein the seatback is formed with cutouts on left and right side thereof, and
   wherein when the vehicle seat is arranged into the storage mode from the seating mode, the pair of left and right rear legs of the seat cushion fit in the cutouts, respectively, and the pair of left and right rear legs are retained in the cutouts in the storage mode.

6. The vehicle seat according to claim 1, wherein the front leg is provided with a stopper which interferes with the seating part so as to regulate forward movement of the front legs in the seating mode.

7. The vehicle seat according to claim 1, wherein each of the rear legs is formed with a hook engageable with a striker which is provided in a recess portion formed in the vehicle floor so that the rear legs are locked on the vehicle floor.

8. The vehicle seat according to claim 1, wherein the seatback is formed with projections at left and right sides thereof, which are guided by grooves formed on a vehicle when the vehicle seat is arranged from the seating mode to the storage mode.

9. The vehicle seat according to claim 8, wherein each of the projections is provided with a pin so as to advance and retreat relative to a surface of the corresponding projection, and
   wherein the pins retreat when the projections are guided by the grooves, and advance at pin catches provided at ends of the grooves when the vehicle seat is in the storage mode.

10. The vehicle seat according to claim 1, wherein the seatback is provided with a lever which is operable in two stages, and wherein when the lever is operated in a first stage, both of the rear legs are unlocked, and when the lever is operated in a second stage, the seatback is unlocked.

11. The vehicle seat according to claim 1, wherein the front leg includes a pair of right and left front legs rotatably attached to the seating part at a left and right portion of the front side of the seating part.

12. The vehicle seat according to claim 1, wherein the seat cushion and the seatback are smaller than those of a driver seat, respectively.

13. The vehicle seat according to claim 1, wherein the seatback is retained in the upright state when the vehicle seat moves from the seating mode to the storage mode.

* * * * *